Oct. 18, 1966  R. F. REIFERS  3,279,978
APPARATUS FOR MAKING MOLDED PULP EGG CARTONS
Original Filed July 16, 1959  3 Sheets-Sheet 1
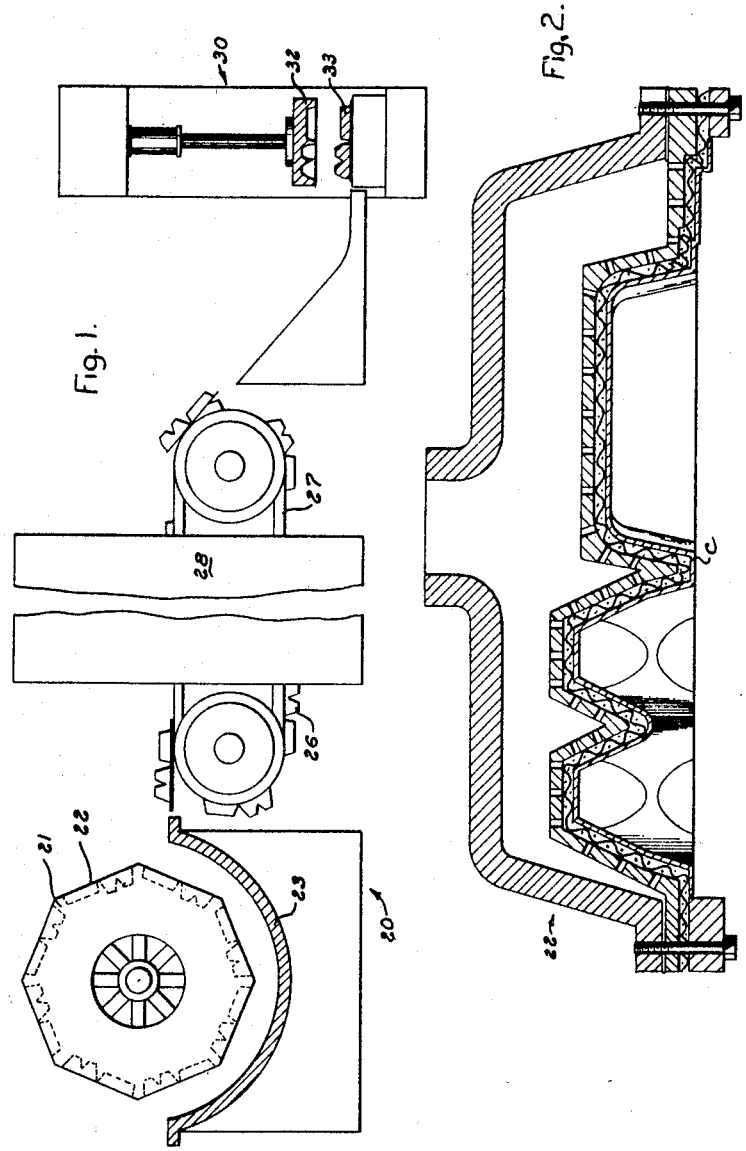
INVENTOR
Richard F. Reifers
BY Karl W. Flocks
ATTORNEY

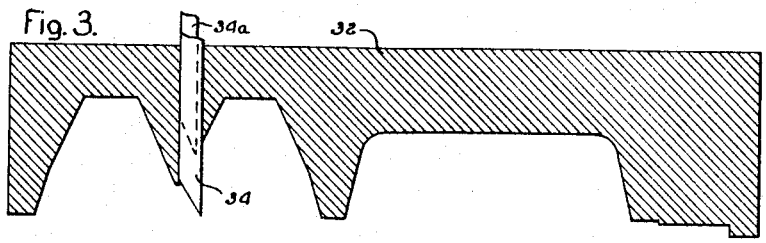
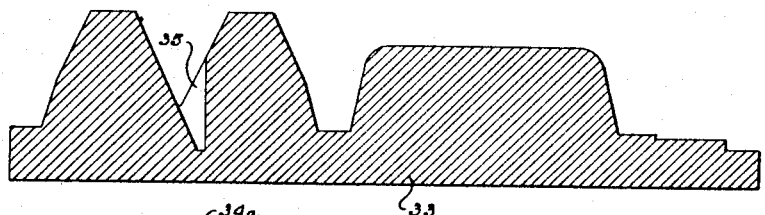
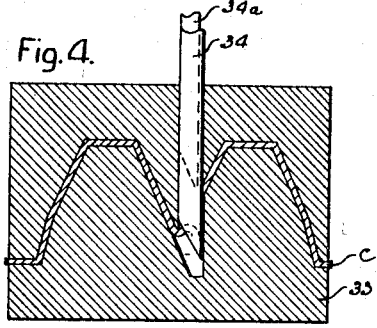
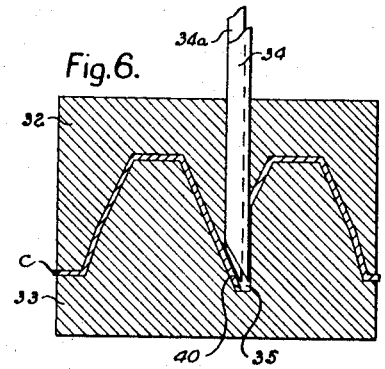
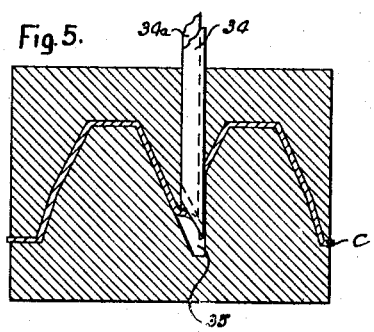

Oct. 18, 1966 R. F. REIFERS 3,279,978
APPARATUS FOR MAKING MOLDED PULP EGG CARTONS
Original Filed July 16, 1959 3 Sheets-Sheet 3

INVENTOR
Richard F. Reifers

BY Karl W. Flocks

ATTORNEY 3,279,978
APPARATUS FOR MAKING MOLDED PULP EGG CARTONS
Richard F. Reifers, New Canaan, Conn., assignor to Diamond International Corporation, New York, N.Y., a corporation of Delaware
Original application July 16, 1959, Ser. No. 827,512, now Patent No. 3,199,758, dated Aug. 10, 1965. Divided and this application June 3, 1965, Ser. No. 461,144
7 Claims. (Cl. 162—410)

This application is a division of Serial No. 827,512, filed July 16, 1959, now Patent No. 3,199,758.

The present invention relates to a method and apparatus for making a molded pulp egg carton, and more particularly to making a molded pulp egg carton having an egg-separating projection or flap cut from the wall of the egg cell and extending upwardly from a saddle formed at the merger of adjacent cell walls.

As was pointed out in my copending application Serial No. 717,664, filed February 26, 1958, for Molded Pulp Egg Carton, now abandoned, the demand for better packaging of eggs so as to diminish egg breakage has resulted in the widespread use of cartons for eggs that afford more protection to the eggs. Thus, great strides have been made in this field, with the result that egg breakage during the handling and marketing operations has been greatly reduced.

Notwithstanding the improvements that have been made and the great protection afforded to eggs by certain types of molded pulp egg cartons, there still occurs, nevertheless, a certain amount of egg breakage and even this amount, small though it may be, is undesirable and should be avoided. It has been discovered that one cause of the breakage that still exists is the striking together of two adjacent eggs during the handling or shipping of the egg cartons.

In my copending application, above noted, I disclosed that a small projection could be provided at a saddle that is formed at the merger of adjacent cell walls, and this projection, extending upwardly from the saddle, would prevent the striking together of eggs in adjacent cells. It was also disclosed in said application that the projection is preferably formed on the carton during the forming operation, i.e. during the forming of the carton onto a forming die that is immersed in a pulp slurry. While the egg-separating projection thus formed is a markedly improved egg carton, the forming of the projection concurrently with the forming of the egg carton necessitates the change in the forming dies, and this change, while of minor nature, is nevertheless a matter of not insignificant cost.

An object of the present invention is to make a molded pulp egg carton having an egg separating projection which is relatively inexpensive.

Another object of the present invention is the provision of a process for making a molded pulp egg carton having an egg-separating projection between egg cells, which process does not require any change to the molding dies.

It is another object of the present invention to make a molded pulp egg carton having an egg-separating projection between the cells thereof, the projection being formed during a step in the known process.

Yet another object of the present invention is to make an egg carton having an egg-separating flap severed therefrom.

Other objects and the nature and advantages of the instant invention will be apparent from the following description taken in conjunction with the accompanying drawings, wherein:

FIG. 1 shows schematically an apparatus for performing the process of the invention.

FIG. 2 is an enlarged view of a forming die shown in FIG. 1.

FIG. 3 is an enlarged view of the pressing dies shown in FIG. 1.

FIGS. 4, 5 and 6 are enlarged partial views showing successive steps during the process.

Figure 7:
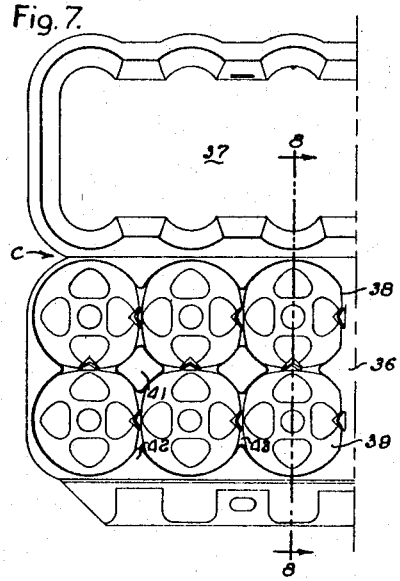
FIG. 7 is a plan view of an egg carton made in accordance with the process of the present invention.

Referring now to the drawings wherein like reference characters are used to designate like or corresponding parts throughout the several views, there is shown in FIG. 1 an apparatus for carrying out the process of the invention, and there may be seen therein the molding apparatus generally designated 20, this molding apparatus comprising in known manner a molding wheel 21 having on the periphery thereof a plurality of forming dies 22. A tank 23 containing a pulp slurry is positioned beneath the wheel 21 so that the dies 22 will be immersed in the slurry as the wheel 21 revolves. In known fashion, when the die 22 is immersed in the slurry, suction will be applied to the inner sides thereof to suck the slurry through the die 22 so that the pulp fibers lodge on the outer surface of the mold, which is usually a fine mesh screen.

Referring to FIG. 2, there is shown therein a die 22 that has the molded pulp egg carton C thereon.

When the carton has been formed on the forming die 22, it leaves the slurry and at this stage contains a great amount of water. The carton is then removed from the die 22 and transferred to a drying form 26 that is carried by a conveyor 27. Conveyor 27 extends through a drying apparatus, preferably a drying oven 28. After traversing the oven 28, the article is placed between pressing dies and is there pressed.

The pressing dies may be mounted as shown in FIG. 1 in a press 30 which carries the mutually reciprocable mating dies 32 and 33. The carton is removed from the drying form 26, and at this stage, of course, it will be understood that the carton is formed and dried and that it usually has at this stage of its manufacture a small amount of warpage. It is transferred by known means to the press 30, and there is then effected a reciprocable movement of one or both of the pressing dies 32 and 33 to cause them to come together and press the carton between them.

As is shown in FIG. 3, the pressing dies 32 and 33 are of mating configuration, generally speaking, the pressing die 32 having a sharpened, hollow steel pin 34 extending therefrom with a punch 34a therein, and the die 33 having a corresponding hole or cavity 35 therein.

In FIGS. 4, 5 and 6 there may be seen the steps by which the projection or flap is cut from the side wall of the carton C and moved to the upstanding position above mentioned. In FIG. 4, the pin 34 may be seen extending from the die 32 and cutting a flap from the carton C positioned on the die 33. In FIG. 5 the punch 34a is descending to engage with and is about to push it into the space provided by the cavity 35, and in FIG. 6 the punch 34a has pushed the projection or flap 40 into its final position. As will be seen, the pin 34, the punch 34a and the flap 40 are received in the cavity 35 of the die 33.

Figure 9:
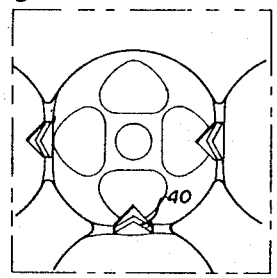
FIG. 9 is an enlarged fragmentary plan view illustrating, on a larger scale, a single egg cell and fragments of adjoining egg cells in accordance with the invention herein set forth.
Figure 8:
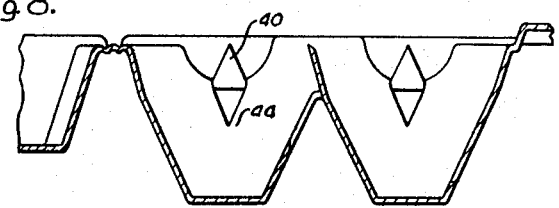
FIG. 8 is an enlarged fragmentary cross-sectional view taken on the line 8—8 of FIG. 7.

Referring now to FIG. 7, the carton C may be seen to comprise a cellular pronouncedly compartmented bottom section 36, to which a non-cellular or open-faced, tray-like cover section 37 is integrally hinged. The interior of bottom section 36 is partially subdivided into two rows of six egg-receiving cells 38. The cells 38 are formed by, and comprise, upwardly and outwardly inclined walls 39, these walls extending upwardly to form posts 41 along the longitudinal center line of the carton and half-posts 42 along the edges of the carton bottom section 36. In addition, the adjacent walls 39 of adjacent cells 38 converge into a saddle-like juncture 43, these junctures 43 extending between the posts 41 and half-posts 42. As is best seen in FIG. 8, the flaps or projections 40 extend upwardly. The base of the flap 40, that is the region 44 that was not cut by the pin 34, lies adjacent the juncture 43. FIG. 9 shows to an enlarged scale the configuration of the parts and the position of the flap or projection 40.

Figure 10:
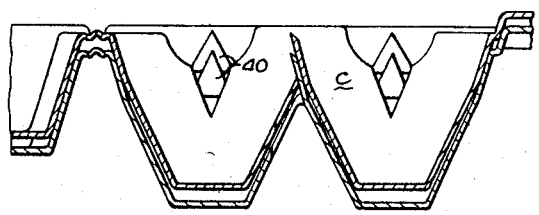
FIG. 10 is a view illustrating the stacking of a plurality of cartons in nested relationship.

In FIG. 10 it may readily be seen that the provision of the projection or flap 40 in no way interferes with the nesting of the cartons C for shipment, for as may be seen therefrom the flap 40 of the lower carton extends through the hole or opening in the side wall of the carton thereabove that was made to form the flap 40 of the upper carton.

It will be readily understood by those skilled in the art that the process may be carried out by apparatus other than that disclosed and shown. As an example, the cutting out or punching out of the flaps 40 could be accomplished on appropriate punch presses that do not press the cartons, and that the punching out operation could take place either before or after the pressing of the carton in the press 30. In addition, it will be understood that the flaps 40 could be cut out by hand and pushed into the desired position by the fingers or a simple hand implement.

Further, it will be understood that the flap has been shown as generally triangular but that if desired other configurations may be used.

It will be obvious to those skilled in the art that various changes may be made without departing from the spirit of the invention and therefore the invention is not limited to what is shown in the drawings and described in the specification but only as indicated in the appended claims.

What is claimed is:

1. Apparatus for making a molded pulp container having a bottom section including a plurality of cells therein with adjacent walls of adjacent cells being upwardly and outwardly inclined and converging in a saddle-like juncture comprising:
    means to form a pulp deposit including a forming die, a pulp slurry vat, and means to pass said forming die into and then out of said pulp slurry;
    means to pass said pulp deposit to a pressing zone;
    means to press said pulp deposit in said pressing zone including a pair of mating dies corresponding generally to the shape of said container, said press means further including both means to separate a flap from one of said cell walls of said container while leaving the flap joined to said container adjacent said juncture and means to subsequently displace said flap to a position in which it extends away from said juncture.

2. An apparatus in accordance with claim 1 wherein said separating means comprises a hollow cutting die and wherein said displacing means comprises a second die which is reciprocatable within said hollow cutting die to reorient said flap after it has been cut by said cutting die.

3. Apparatus for making a molded pulp container having an article holding bottom section including a plurality of article receiving cells therein with adjacent walls of adjacent cells being upwardly and outwardly inclined and converging in a saddle-like juncture comprising:
    means to pass a forming die into a pulp slurry;
    means to effect deposition of a layer of pulp on said forming die while in said slurry, in the general shape of said container;
    separating die means;
    means to remove said container from said slurry to said separating die means;
    said separating die means including means to die-cut a flap from one of said cell walls while leaving the flap joined to said article receiving bottom by a base adjacent said saddle-like juncture; and
    means to reorient said flap to a position in which it extends upwardly away from said juncture.

4. An apparatus in accordance with claim 3 further comprising means to press said pulp container associated with said separating die means so that pressing is carried out generally at the same time at which said separating die means acts on said carton.

5. An apparatus in accordance with claim 4 wherein said pressing means acts on said container prior to said separating die means.

6. Apparatus in accordance with claim 3 wherein said means to die cut a flap comprises a cutting die which cuts through said pulp wall.

7. An apparatus in accordance with claim 3 wherein said means to reorient said flap causes said flap to upwardly extend in the same plane as said adjacent cell wall.

References Cited by the Examiner
UNITED STATES PATENTS 1,922,145   8/1933   Troyk _____ 229—29
2,515,113   7/1950   Chaplin _____ 162—223

DONALL H. SYLVESTER, *Primary Examiner.*

J. H. NEWSOME, *Assistant Examiner.*